(12) United States Patent
Turner, Jr.

(10) Patent No.: US 10,147,109 B2
(45) Date of Patent: Dec. 4, 2018

(54) SYSTEMS AND METHODS FOR OBTAINING AND USING TARGETED INSIGHTS WITHIN A DIGITAL CONTENT AND INFORMATION SHARING SYSTEM

(71) Applicant: PARALLEL 6, INC., San Diego, CA (US)

(72) Inventor: David W. Turner, Jr., San Diego, CA (US)

(73) Assignee: PARALLEL 6, INC., San Diego, CA (US)

(*) Notice: Subject to any disclaimer, the term of this patent is extended or adjusted under 35 U.S.C. 154(b) by 0 days.

(21) Appl. No.: 14/507,735

(22) Filed: Oct. 6, 2014

(65) Prior Publication Data
US 2015/0025937 A1 Jan. 22, 2015

Related U.S. Application Data

(63) Continuation of application No. 14/092,882, filed on Nov. 27, 2013, now Pat. No. 8,856,031.
(Continued)

(51) Int. Cl.
| | |
|---|---|
| G06F 15/16 | (2006.01) |
| G06Q 30/02 | (2012.01) |
| H04L 29/08 | (2006.01) |

(52) U.S. Cl.
CPC ......... G06Q 30/0205 (2013.01); G06Q 30/02 (2013.01); G06Q 30/0214 (2013.01);
(Continued)

(58) Field of Classification Search
CPC ............... G06Q 30/02; G06Q 30/0241; G06Q 30/0277
(Continued)

(56) References Cited

U.S. PATENT DOCUMENTS

| | | | |
|---|---|---|---|
| 7,711,580 B1 | 5/2010 | Hudson | |
| 7,899,685 B2 | 3/2011 | Wallach et al. | |

(Continued)

FOREIGN PATENT DOCUMENTS

| | | |
|---|---|---|
| KR | 1020120020915 A | 3/2012 |
| KR | 1020120124856 A | 11/2012 |

OTHER PUBLICATIONS

International Search Report and Written Opinion dated Aug. 6, 2014, in corresponding International Application PCT/US2014/030900, 11 pages.
(Continued)

Primary Examiner — Hieu T Hoang
(74) Attorney, Agent, or Firm — Kilpatrick Townsend and Stockton LLP

(57) ABSTRACT

Systems, methods, and computer-readable media for obtaining insight information for a plurality of user devices. In an embodiment, an identification of target location(s) are received from a client. For each of the target location(s), the target location is categorized, and insight algorithm is automatically selected for the target location from a plurality of different insight algorithms based on the categorization of the target location. The selected insight algorithm can be configured to, for each of a plurality of user devices, receive a location of the user device, and determine whether or not to store an event record for the user device based on the location of the user device.

20 Claims, 3 Drawing Sheets

Related U.S. Application Data

(60) Provisional application No. 61/798,358, filed on Mar. 15, 2013.

(52) U.S. Cl.
CPC ..... *G06Q 30/0226* (2013.01); *G06Q 30/0241* (2013.01); *G06Q 30/0277* (2013.01); *H04L 67/1091* (2013.01); *H04L 67/18* (2013.01)

(58) Field of Classification Search
USPC .......... 705/14.73, 14.66, 14.51, 14.58, 14.57
See application file for complete search history.

(56) References Cited

U.S. PATENT DOCUMENTS

| | | | |
|---|---|---|---|
| 7,953,654 B2 | 5/2011 | Abifaker | |
| 8,312,079 B2 | 11/2012 | Newsome et al. | |
| 8,386,322 B2 | 2/2013 | Williams et al. | |
| 8,402,387 B1* | 3/2013 | Iversen | G06Q 30/0242 715/789 |
| 8,548,849 B1 | 10/2013 | Porter | |
| 8,611,871 B2* | 12/2013 | Terrell, II | G06Q 30/02 455/414.2 |
| 2002/0069037 A1* | 6/2002 | Hendrickson | H04L 12/2602 702/186 |
| 2002/0069116 A1 | 6/2002 | Ohashi et al. | |
| 2003/0139942 A1 | 7/2003 | Rakshit et al. | |
| 2003/0204418 A1 | 10/2003 | Ledley | |
| 2004/0010418 A1 | 1/2004 | Buonocore et al. | |
| 2004/0064344 A1 | 4/2004 | Link et al. | |
| 2005/0149397 A1 | 7/2005 | Morgenstern et al. | |
| 2005/0182657 A1 | 8/2005 | Abraham-Fuchs et al. | |
| 2005/0193335 A1 | 9/2005 | Dorai et al. | |
| 2005/0234781 A1 | 10/2005 | Morgenstern et al. | |
| 2005/0243784 A1 | 11/2005 | Fitzgerald et al. | |
| 2006/0129433 A1 | 6/2006 | Koneru | |
| 2006/0161599 A1 | 7/2006 | Rosen | |
| 2006/0224421 A1 | 10/2006 | St. Ores et al. | |
| 2006/0256133 A1* | 11/2006 | Rosenberg | G06Q 30/02 345/619 |
| 2006/0259360 A1* | 11/2006 | Flinn | G06Q 30/02 705/14.71 |
| 2006/0259361 A1 | 11/2006 | Barhydt et al. | |
| 2006/0282292 A1 | 12/2006 | Brink et al. | |
| 2007/0005424 A1 | 1/2007 | Arauz | |
| 2007/0258626 A1 | 11/2007 | Reiner | |
| 2007/0265917 A1* | 11/2007 | Belanger | G06Q 30/02 705/14.39 |
| 2008/0228582 A1 | 9/2008 | Fordyce et al. | |
| 2008/0300915 A1 | 12/2008 | Molmenti et al. | |
| 2009/0093688 A1 | 4/2009 | Mathur | |
| 2009/0150215 A1 | 6/2009 | Kalb et al. | |
| 2009/0164245 A1 | 6/2009 | Toleti et al. | |
| 2009/0198579 A1* | 8/2009 | Lewis | G06Q 30/02 705/14.47 |
| 2009/0271289 A1 | 10/2009 | Klinger et al. | |
| 2009/0288012 A1 | 11/2009 | Hertel et al. | |
| 2009/0298480 A1 | 12/2009 | Khambete et al. | |
| 2009/0299856 A1 | 12/2009 | Caunter | |
| 2009/0313048 A1 | 12/2009 | Kahn et al. | |
| 2010/0015991 A1 | 1/2010 | Evans et al. | |
| 2010/0036719 A1 | 2/2010 | Eklund | |
| 2010/0042471 A1 | 2/2010 | Chang et al. | |
| 2010/0042487 A1 | 2/2010 | Barazani | |
| 2010/0062794 A1* | 3/2010 | Han | G06Q 10/04 455/457 |
| 2010/0088245 A1 | 4/2010 | Harrison et al. | |
| 2010/0094650 A1 | 4/2010 | Tran et al. | |
| 2010/0106577 A1 | 4/2010 | Grimes | |
| 2010/0250285 A1 | 9/2010 | Shelton | |
| 2010/0332258 A1 | 12/2010 | Dahlke et al. | |
| 2011/0015987 A1 | 1/2011 | Chakraborty et al. | |
| 2011/0047013 A1 | 2/2011 | McKenzie, III | |
| 2011/0072107 A1 | 3/2011 | Gutta et al. | |
| 2011/0119075 A1 | 5/2011 | Dhoble | |
| 2011/0153361 A1 | 6/2011 | Hanina et al. | |
| 2011/0161167 A1 | 6/2011 | Jallapuram | |
| 2011/0191184 A1 | 8/2011 | Blackhurst et al. | |
| 2011/0238495 A1* | 9/2011 | Kang | G06Q 30/02 705/14.49 |
| 2011/0246287 A1 | 10/2011 | Wright et al. | |
| 2011/0264494 A1 | 10/2011 | Lechowicz | |
| 2011/0270617 A1 | 11/2011 | Murta et al. | |
| 2011/0295703 A1* | 12/2011 | Flinn | G06Q 30/02 705/14.73 |
| 2011/0307340 A1 | 12/2011 | Benmbarek | |
| 2011/0307917 A1 | 12/2011 | Shuster | |
| 2011/0320967 A1 | 12/2011 | Knitowski et al. | |
| 2012/0131570 A1 | 5/2012 | Kaikkonen et al. | |
| 2012/0150598 A1 | 6/2012 | Griggs | |
| 2012/0158420 A1 | 6/2012 | Lacal | |
| 2012/0215617 A1* | 8/2012 | Shah | G06Q 30/02 705/14.35 |
| 2012/0246003 A1 | 9/2012 | Hart et al. | |
| 2012/0284108 A1 | 11/2012 | Fontana et al. | |
| 2013/0006705 A1* | 1/2013 | Votaw | G06Q 30/02 705/7.29 |
| 2013/0080239 A1 | 3/2013 | Okerlund | |
| 2013/0211904 A1* | 8/2013 | Bax | G06Q 30/0251 705/14.41 |
| 2013/0262494 A1* | 10/2013 | Petersen | G06Q 10/10 707/758 |
| 2013/0297340 A1 | 11/2013 | Van Zon et al. | |
| 2013/0332235 A1 | 12/2013 | Kuppusamy | |
| 2014/0032656 A1* | 1/2014 | Hyman | G06Q 30/02 709/204 |

OTHER PUBLICATIONS

EESR dated Nov. 2 2016, for EP Application No. 14763461.2 (7 pages).
International Search Report and Written Opinion for related PCT Application No. PCT/US2017/025213, dated Jun. 30, 2017.
Janofsky. "The Hopkins Competency Assessment Test: A Brief Method for Evaluating Patients' Capacity to Give Informed Consent." Hospital and Community Psychiatry. 43(2):132-136 (Feb. 1992).

\* cited by examiner

SYSTEMS AND METHODS FOR OBTAINING AND USING TARGETED INSIGHTS WITHIN A DIGITAL CONTENT AND INFORMATION SHARING SYSTEM

CROSS-REFERENCE TO RELATED APPLICATIONS

This application is a continuation of U.S. patent application Ser. No. 14/092,882, filed on Nov. 27, 2013 and issued as U.S. Pat. No. 8,856,031 on Oct. 7, 2014, which claims priority to U.S. Provisional Patent App. No. 61/798,358, filed on Mar. 15, 2013, the entireties of each of which are hereby incorporated herein by reference.

BACKGROUND

Technical Field

The embodiments described herein are related to the field of mobile technology and mobile platforms that gather and store event based information and more specifically to systems and methods that allow the location of a set of users to be determined and certain information to be pushed to the user's based on this information.

Background

Many businesses have developed social media marketing programs to help them stay connected with their clients and customers. Many such programs recognize that the clients are mobile and often access their social media via a mobile device. At the same time, many approaches have been proposed and developed to allow businesses to push content such as advertisements or special offers to customer's mobile devices based on the location of the customer as determined using their mobile device.

Many such conventional systems, however, fail to harness the full capabilities of technology such as social media, mobile devices, location based information, and the ability to push messages to mobile devices in order to not only gain insights about a customer base, but to provide meaningful action based on those insights that will fully leverage such technologies.

SUMMARY

Systems and methods for obtaining target insights about a plurality of users based on defined locations and target verticals are described in detail herein.

According to one aspect, a system for obtaining insight information for a plurality of client applications and a plurality of mobile users, comprises a content management system module configured to distribute a plurality of types of content to the plurality of mobile users, wherein at least one of the content and types of content differs for each of the plurality of client applications; an insights module configured to allow a client associated with a specific client application to define one or more locations and select a target vertical, select an insights algorithm based in the target vertical, identify the status of the plurality of users relative to the defined locations, and cause the content management system module to distribute certain types of content to the plurality of users based on the status; and a data wharehouse configured to store the status information for each of the plurality of client applications and associated users.

According to one aspect a system for obtaining insight information for a plurality of client applications and a plurality of mobile users, comprises a content management system module configured to distribute a plurality of types of content to the plurality of mobile users, wherein at least one of the content and types of content differs for each of the plurality of client applications; an insights module configured to allow a client associated with a specific client application to define one or more locations and select a target vertical, select an insights algorithm based in the target vertical, identify the status of the plurality of users relative to the defined locations, and cause the content management system module to distribute certain types of content to the plurality of users based on the status; a mobile application front end application for each of the client applications, configured to run on a mobile device associated with each of the plurality of users associated with a given client application, and wherein the mobile front end application is configured to send a message to the insights module each time a pre-defined event or action occurs on the mobile device, and a data wharehouse configured to store the status and event information for each of the plurality of client applications and associated users.

DETAILED DESCRIPTION

The systems and methods described herein are directed to a mobile platform that can be used to build and manage enterprise strength applications that allow a business to interact with its customers and potential customers in a meaningful way based on insights gleaned from the customer's activity and feedback. The platform is described below in detail. Specifically, the ability to glean certain target insights are described whereby the mobile platform allows a user to upload a group of target locations either in singular form, bulk form or input through another system via an API, and associate those targets as competitive in nature, sponsors, partners, or other targets of interest including association with industry verticals. Based on the industry vertical for each target, each target will then be assigned a predetermined or dynamic rules-based algorithm that will associate event-based location data from a location-aware device and capture information from that location-based device based on the algorithmic results. The result will be to determine when a location-aware device or group of location-aware devices is within or near the target locations.

What this means is that a company, after associating these key locations (competitive, partner, sponsor, and other) anywhere in the world, can identify when a mobile application user passes through those locations and identify those users through information provided by the mobile or tablet device and mobile application, tablet application, mobile enabled website, etc., running thereon. This information can then be stored in a database for later use. Companies can then identify when their mobile application users, whether they are internal users or consumer users, are in the target locations. The platform can then be configured to deliver contextual messaging to the users. The platform can also be configured to run reports and analytics that can segment those users based on age, gender, and other attributes. This segmenting can allow even more contextual messaging in the future.

This contextual messaging, produce reports, insights, etc., can be delivered or obtained in near real time allowing the company to make valuable decisions regarding how they are messaging, communicating, and positioning in marketplace. Thus, key insights as to when a company's mobile application users are interfacing with their businesses, interfacing with competitors, interacting with partners, associating with sponsors or any other targets of interest that a company may have can be gathered with depth an insight not available in convention systems.

Figure 1:
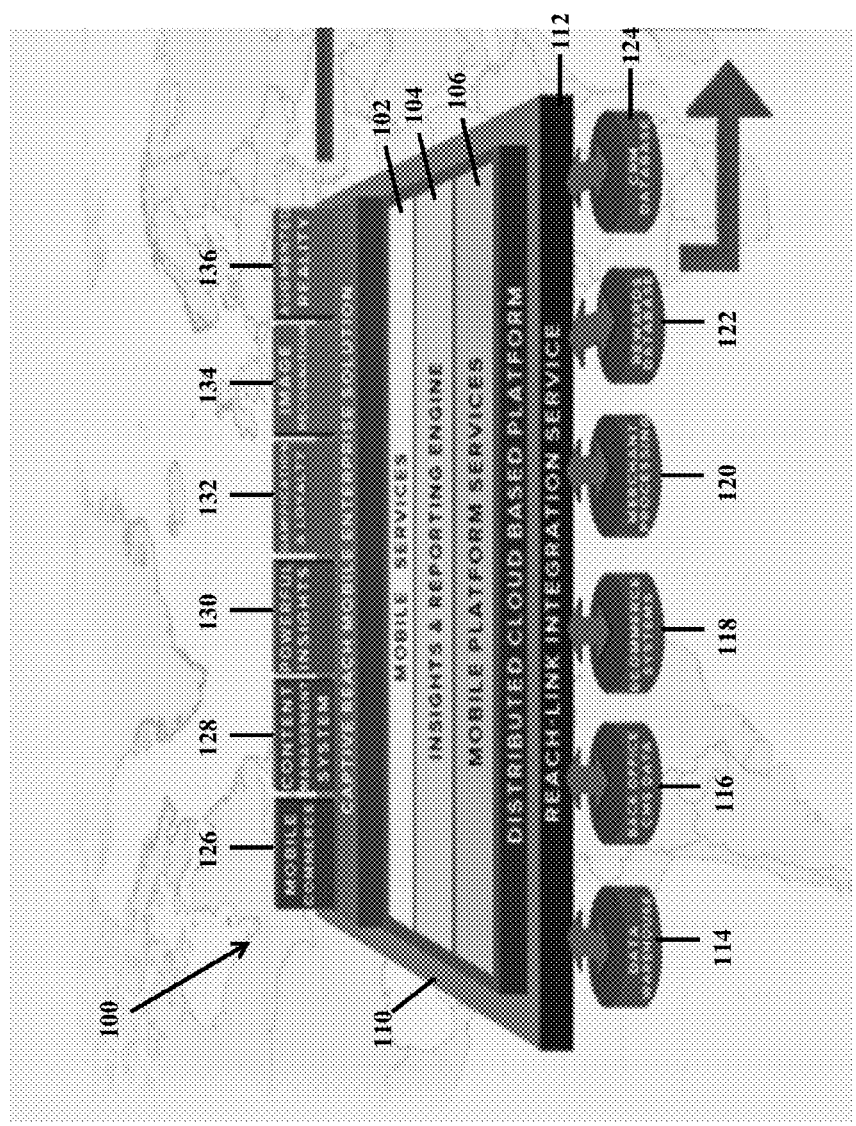
FIG. 1 is a diagram illustrating an example system for a digital content and information sharing in accordance with one embodiment.

FIG. 1 is a diagram illustrating an example system 100 for digital content and information sharing in accordance with one embodiment. At the core of system 100 is, for example, a distributed cloud-based platform 110 configured to provide services such as mobile service 102, insights and reporting 104, and mobile platform services 106. These services can be integrated, via an integration service 112, with resources such as a data wharehouse 114, a back office CMS data 116, an e-commerce system 118, a merchant processing 120, a rewards database 122, and a CRM database 124.

These services and resources can then be used to provide various applications to a business or user of system 100. These applications include mobile ecommerce 126, content management 128, insights 130, gamification and loyalty 132, image recognition 134 and augmented reality 136. At least some of these applications are described in detail below.

Content Management System

The content management system module or application 128 is a module built into the Captive Reach platform 110 for distributing various types of content to one or multiple front-end mobile applications that are tied to Captive Reach 110. In one example embodiment, there are nine primary types of content that can be distributed through the Captive Reach CMS module 128, all of which will be described in detail in the following sections.

Content that is distributed to mobile applications through Captive Reach 110 can be configured such that it is delivered according to a specific delivery schedule. Therefore, a brand can enter a date range, specific days of the week, specific hours of the day for each discrete piece of content to present itself on a user's front-end mobile application. Therefore, content can be pre-loaded into the CMS module 128 in Captive Reach 110 and will automatically display at the desired time of day or day of the week throughout a pre-defined range of dates.

Content loaded into the CMS module 128 can also be segmented for delivery to a certain subset of application users based on a series of demographic requirements. Each application (e.g., 126-136) that is connected to Captive Reach 110 can include a profile section for collecting demographic information from each of the front-end users. This information can be used to target and distribute content to users that match a specific demographic profile. Some examples of segmentation include: gender, age, ethnicity, religion, likes/interests, etc. Administrators of the Captive Reach platform 110 can have the ability to predefine these demographic requirements for segmentation when setting up a piece of content for distribution. Users who have a profile that matches the demographic segmentation requirements will receive the content on their mobile device, and users who do not exactly match that particular profile will not receive that particular piece of content. Segmentation allows the administrator of the backend platform to run targeted content campaigns based on a very specific (or broad) set of demographic requirements, in order to increase the relevancy each piece of content has to the front end user.

Content loaded into the Captive Reach platform 110 also has the ability to be targeted based on the position location of a user's mobile device. Each Captive Reach enabled mobile application utilizes location-based services to send a latitude-longitude location of each application user back to the platform 110 for geographic segmentation. Geographic segmentation works by setting up what is called a geofence. A geofence is a pre-defined radius around a specific position-location that triggers the distribution of content to a front-end mobile application once the device's position location registers as being within the radius of the fence. Captive Reach 110 holds a locations database, e.g., which can be part of the data wharehouse 114 that can be used for setting up a single or multiple geo-fences for a piece of content. The platform 110 can be configured to log a user's position location every time a major location change is registered by the backend platform. If the user's location is within a predefined geofence that relates to an active piece of content, the user will then receive the content on their device. Otherwise, they will not. Geofencing ensures that location specific content is only delivered to users who are in a particular geographic region for which that content is relevant, and users who are outside of that area do not receive that particular piece of content.

The types of content that can be shared through the CMS module can include advertisements, brands, events, information, galleries, news, offers, places and promotions.

Advertisements are a form of content that can be distributed via Captive Reach 110 to a front end mobile application. Advertisements are typically a large banner-type advertisement that is visible on the home page, or some prominent page within the mobile application. The components of an advertisement can consist of a title, a URL or place within the app to direct the user upon click, and an image representing the advertisement. One or many advertisements can be loaded into the Captive Reach backend platform 110, and will immediately present themselves on the mobile application. Administrators of the Captive Reach backend platform 110 can have the ability to schedule, segment, and geofence each advertisement being run through Captive Reach 110 in order to increase the relevancy of ads to the front-end users. Multiple advertisements sent to the same device may appear according to the order of the ads on the Captive Reach backend platform 110, and may be scrollable via cover flow technology and swiping on the front-end mobile application.

Events are a form of content that can be created and configured through the Captive Reach backend platform 110. This type of content pertains to a specific event that is happening on a specific date or throughout a date range. The components of event content include a title, description of the event, image(s), phone number (touch to call capabilities), start and end dates, and the specific location of the event. When event-type content is loaded into the backend platform, it will be associated with a specific category for this type of content. Events can also be scheduled, segmented, and geofenced according to an administrator's requirements and the event location. Additionally, event-type content has the ability to be shared through social media channels directly from the mobile application in order to increase the reach/exposure for a particular event. This is described in more detail below.

Administrators of Captive Reach 110 have the ability to incentivize users to share event content by awarding a point total to the user for doing so. This loyalty type feature can be custom configured on the backend platform on a per event basis, and can be changed at any time. Sharing can also be disabled for a particular event if the administrator of Captive Reach would like to keep the recipient list exclusive.

Information can be another type of general content that can be created and distributed by the Captive Reach backend platform 110. Information content is simply general informative or educational content that the Captive Reach administrator would like to push to the applications in their user universe. Information content contains a title, image(s), and a general description for the piece of content. This type of content can also be scheduled, segmented, and geofenced based on a predefined set of parameters. Additionally, information content has sharing and loyalty associated with it, so point totals can be assigned to the content as an incentive for users to share content. Information content is assigned to a category and when a change in made on the backend, it will immediately be reflected in all front-end mobile applications to which that particular piece of content was distributed.

The backend platform 110 can allow for the creation and distribution of image galleries down to mobile applications from the backend platform 110. An image gallery module (not shown) can be included within the CNS module 128, or as a standalone module, and can allow the administrator to upload a series of images that are to be displayed in an image gallery category on the front-end mobile app. The platform 110 can support multiple image capabilities. In certain embodiments, the users interact with images on the device by using coverflow technology, which allows them to swipe through the various images available. Images loaded through the platform can be geo-fenced, demographically segmented, and scheduled prior to distribution.

The news section (not shown) of the backend platform 110 allows the administrator to upload news based articles to the platform 110 and have those pushed to the front-end mobile application in real time. News follows the same format as other content areas in the CMS module 128 containing a title, body text, external link option, and social sharing aspects. Any news article can be geo-fenced, segmented demographically, and scheduled for delivery.

Offers are another form of content that can be distributed via the content management system module 128. Offer type content is designed to host a deal for a particular good or service. It contains all of the same content fields as other content types run through the CMS module 128. However it can allow the administrator to input a dollar value amount, an original price amount, and when the content renders on the front-end, it automatically calculates a savings percentage for the end user. Offers run through the CMS module 128 can also be redeemed by the user, such that they cannot re-use or recycle offers. Redemption is done through the entry of a redemption code that reconciles with the backend platform 110 and either allows the user to successfully redeem the offer or not. The number of redemptions allowed, either per user or per offer, can be configured through the backend platform 110. Once a user reaches their maximum number of redemptions, they can no longer see the redemption option on the offer detail page.

The Insights Module

The insights module 130 of the Captive Reach platform 110 allows administrators to see reports on application usage across the entire user universe. Insights come in several forms and focus on reports detailing, for example: how users are engaging with content, most popular content on the app, where users are when they are viewing content, what social channels users are sharing through, and other custom defined reports based on the features and functionality of the front-end application(s). Insights can be powered by an "events" architecture that is built into every Captive Reach powered mobile application. The events architecture works by sending an API call to the Captive Reach platform 110 each time a pre-defined event or action occurs on the mobile device. Using this architecture, a front-end mobile application can be setup to send an event every time a specific page is viewed, button is clicked, etc. When going through the Captive Reach mobile integration process, events can be defined during the requirements phase of the project cycle. These specific events are then integrated into the mobile application code for each application developed, and reports on the backend are built off of all events that are tracked and logged.

The following are specific insights reports that are can be available through the Captive Reach platform 110: Content Insights; Market Based Insights; Consumer Insights; Target Insights, Geographic Insights; and Social Insights. At least some of these are described in more detail below.

Content Insights are reports based on the events architecture that track a particular event on the mobile application related to content views. These reports are sourced based on the types of content pushed to a mobile application that come out of the content management system module 128. Reports can be sorted and filtered based on the type of event being tracked, and can also be broken down by date range.

Consumer insights show a roll up of user activity on the mobile application broken down by month. The top level summary shows the number of active applications during a particular month, along with the number of times the application was opened, number of items shared through social media, the number of offers redeemed, the number of push notification alerts received, and the total number of points awarded to users. Administrators of the backend platform 110 can select a particular month and be presented with a breakdown of all active users who used the application within that given month, along with their top-level statistics around opens, shares, redemptions, push notifications, and total points awarded. The administrator can delve in one layer deeper by clicking on an individual user's name in order to see a detailed user profile with their activity of application usage. The user profile shows the basic demographic information collected for that user, their last known location, along with their summary statistics around what content they have viewed and engaged with on the mobile application.

The Target Insights are an important set of algorithms based on market verticals that can, for example, be defined as: Hospitality, Convenience Stores, General Retail, Restaurants, and Gaming and Casinos.

The algorithms developed are intended to locate a device, identify when that device is in a target location, associate that target location with an algorithm, and define based on the target location, target vertical, and the associated algorithm, if that device should be captured and if so, what elements of the device should be captured within the platform 110 and reported.

For example, in the hospitality space, the system 100 can be set up to determine when the user is at or near the client's locations as well as when the user is at or near a competitor. Other information such as how long was the user at or near the client's locations, how long the user is at or near a competitor's location, etc. Thus, for example, if the system 100 determines that a user is nearing the client's location, then the client's application built on platform 110 can be configured to message the user with a limited time offer or promotion. Moreover, and maybe more importantly, when it is determined that user is near a competitor's location, the same type of offers can, for example, be pushed to the user's device.

This type of information can also be used to allow the client to determine how much time the users are spending at or near their locations as well as how long they are spending at or near competitor' locations, and to compare the two or run other analytics on this information. An example Pseudo-code Algorithm for Hospitality industry is included here:

```
input:
    COMPETITIVE_LOCS[loc0 . . . locn-1]
    USER_HOME_LOC
    USER_LOC
    HANDSET_TIME
method:
    initialize:
        duration            = 0
        last_user_loc       = USER_LOC
        time                = HANDSET_TIME
        hospitality         = false
    constants:
        MAX_RADIUS          = 100km
        MIN_RADIUS          = 100m
        MIN_DURATION        = 4hrs
    while time is between 0 and 6 HRS AND hospitality is false do
        USER_LOC //get user location
        if USER_LOC is equal or greater than
        ( USER_HOME_LOC + MAX_RADIUS ) then
            for each loc in COMPETITIVE_LOCS, do
                if USER_LOC is minor or equal than ( loc + MIN_RADIUS )
                then valid_area = true
                    exit from each loop
            if valid_area is true then
                if duration is 0 then
                    start_duration_timer
                if USER_LOC is last_user_loc then
                    if duration is equal or greater than 4 HRS then
                        LOG 'USER_ID + USER_GENDER + USER_AGE +
                        LOCATION_ID + DATETIME' hospitality = true
                else
                    last_user_loc is USER_LOC now
                    timer = 0 //restart timer
                time    = HANDSET_TIME
                valid area = false
```

A Pseudocode Algorithm for Convenience Stores can be as follows:

```
input:
    COMPETITIVE_LOCS[loc0 . . . locn-1]
    USER_LOC
    HANDSET_TIME
method:
    initialize:
        duration            = 0
        last_user_loc       = USER_LOC
        time                = 0
        changes             = 0
        valid area          = false
        registered          = false
    constants:
        MAX_RADIUS          = 50m
        FREQUENCY           = 2
        LAPSE               = 5min
        MAX_TIME            = 10min
        MIN_TIME            = 5min
    start_timer
    while changes < FREQUENCY do
        if time < LAPSE then
            USER_LOC
            if last_user_loc != USER_LOC then
                changes += 1
                last_user_loc = USER_LOC
            else
                time    = 0
                changes = 0
        if changes is 2 then
            for each loc in COMPETITIVE_LOCS, do
                if USER_LOC is minor or equal than ( loc + MIN_RADIUS )
                then valid_area = true
                    start_duration_timer
                    exit each loop
            if valid_area = true then
                while USER_LOC = last_user_loc AND registered = false do
                    USER_LOC
                    if duration > MIN_TIME AND duration < MAX_TIME
                    then
                        registered = true
                        LOG 'USER_ID + USER_GENDER + USER_AGE +
                        LOCATION_ID + DATETIME'
```

A Pseudocode Algorithm for General Retail can be as follows:

```
input:
    COMPETITIVE_LOCS[loc0 . . . locn-1]
    USER_LOC
    HANDSET_TIME
method:
    initialize:
        duration            = 0
        last_user_loc       = USER_LOC
        time                = 0
        changes             = 0
        valid area          = false
        registered          = false
    constants:
        MAX_RADIUS          = 50m
        FREQUENCY           = 2
        LAPSE               = 5min
        MAX_TIME            = 60min
        MIN_TIME            = 10min
    start_timer
    while changes < FREQUENCY do
        if time < LAPSE then
            USER_LOC
            if last_user_loc != USER_LOC then
                changes += 1
                last_user_loc = USERLOC
            else
                time    = 0
                changes = 0
        if changes is 2 then
            for each loc in COMPETITIVE_LOCS, do
                if USER_LOC is minor or equal than ( loc + MIN_RADIUS )
                then valid_area = true
                    start_duration_timer
                    exit each loop
            if valid_area = true then
                while USER_LOC = last_user_loc AND registered = false do
                    USER_LOC
                    if duration > MIN TIME AND duration < MAX_TIME
                    then registered = true
                        LOG 'USER ID + USER GENDER + USER AGE +
                        LOCATION ID + DATETIME'
```

A pseudocode Algorithm for Restaurants can include the following:

```
input:
    COMPETITIVE_LOCS[loc0 . . . locn-1]
    USER_LOC
    HANDSET_TIME
method:
    initialize:
        duration            = 0
        last_user_loc       = USER_LOC
```

```
    time                = 0
    changes             = 0
    valid area          = false
    registered          = false
  constants:
    MAX_RADIUS          = 50m
    FREQUENCY           = 2
    LAPSE               = 5min
    MAX_TIME            = 180min
    MIN_TIME            = 30min
  start_timer
  while changes < FREQUENCY do
    if time < LAPSE then
      USER_LOC
      if last_user_loc != USER_LOC then
        changes += 1
        last_user_loc = USER_LOC
    else
      time    = 0
      changes = 0
    if changes is 2 then
      for each loc in COMPETITIVE_LOCS, do
        if USER_LOC is minor or equal than ( loc + MIN_RADIUS )
          then valid_area = true
          start_duration_timer
          exit each loop
      if valid_area = true then
        while USER_LOC = last_user_loc AND registered = false do
          USER_LOC
          if duration > MIN_TIME AND duration < MAX_TIME
            then registered = true
            LOG 'USER ID + USER GENDER + USER AGE +
            LOCATION ID + DATETIME'
```

A pseudocode Algorithm for Gaming and Casinos can include the following:

```
input:
  COMPETITIVE_LOCS[loc0 . . . locn−1]
  USER_LOC
  HANDSET_TIME
method:
  initialize:
    duration            = 0
    last_user_loc       = USER_LOC
    time                = 0
    changes             = 0
    valid area          = false
    registered          = false
  constants:
    MAX_RADIUS          = 50m
    FREQUENCY           = 2
    LAPSE               = 5min
    MAX_TIME            = 560min
    MIN_TIME            = 100min
  start_timer
  while changes < FREQUENCY do
    if time < LAPSE then
      USER_LOC
      if last_user_loc != USER_LOC then
        changes += 1
        last_user_loc = USER_LOC
      else
        time    = 0
        changes = 0
    if changes is 2 then
      for each loc in COMPETITIVE_LOCS, do
        if USER_LOC is minor or equal than ( loc + MIN_RA-
DIUS )
          then valid_area = true
          start_duration_timer
          exit each loop
      if valid_area = true then
        while USER_LOC = last_user_loc AND registered = false
do
          USER_LOC
          if duration > MIN_TIME AND duration < MAX_TIME
            then registered = true
            LOG 'USER ID + USER GENDER + USER AGE +
            LOCATION ID + DATETIME'
```

Thus, a client or business can upload a list of target locations and associate each location with an industry vertical. Once an industry vertical is associated with a location, a rules-based algorithm will be associated with each location. As location-aware devices send event-based updates to the mobile platform 110, each device will be run through the rules-based algorithm, and if the algorithm variable USER_LOC results in a positive result, event-based data will be captured from the handset and stored in a database or flat-file structure within the mobile platform 110 for future analytics and reporting.

In this way, when a location-based device is located on or near a predetermined location uploaded by a client. The method will allow a user to perform the following tasks mainly to upload target locations and define which vertical those locations are associated, and report on when location based devices are on or near target locations.

Geographic insights relate to the physical geographic disbursement of users throughout the world. Users can be shown on a map viewfinder based on their concentrations in various geographic areas across the globe. Administrators have the ability to click on a particular concentration of users and be taken to a close-up view of that geographic region, showing in more detail where the application users are located. Administrators have the ability to filter the results shown on the map based on various demographic profile components (age, gender, etc.) and/or device type.

Social Insights show detailed reports on how users are engaging with social media from within the mobile application. By default, this report displays how many items have been shared through social media in any given month, along with the specific social media channel that content was shared through (i.e. Facebook, Twitter, LinkedIn). Administrators have the ability to focus on a particular month and see a breakdown of all of the users who have engaged with social media that month, along with their individual sharing behavior.

The Captive Reach mobile platform can have a built-in gamification module 132 that enables the use of game mechanics, progress tracking, and rewards distribution all through a central platform 110, without the use of disparate systems. The gamification module 132 of the mobile platform will be used to power the rewards points system for all Captive Reach enabled mobile applications.

All mobile platform enabled mobile applications can be enabled with API linkages to Facebook, Twitter, and LinkedIn on the end-user side. Users have the ability to connect to these social networks for the purpose of sharing content on the mobile application with their respective social networks. Sharing can be enabled or disabled for any piece of content on the mobile application through configuration on the mobile platform. When sharing is enabled, front-end application users can, e.g., see a button or icon to share that particular piece of content. When the user selects the sharing option, they can be presented with the various networks through which the content can be shared. In order to incentivize users to share content through social media, content can be assigned a point value. When a user shares content, they can then be rewarded the corresponding point value.

In order to power the distribution of rewards for application behavior, each platform enabled application uses an "events architecture." Events architecture is a simple API call that is made to the mobile platform server when a specific action or "event" occurs on the mobile application. A list of actions or triggers to make a platform call are defined during the requirements definition phase of the project cycle, and will serve as the basis for users to accumulate points, advance the progress of the user's profile, and/or be rewarded for completing tasks. Events on the mobile application will be classified according to their business objective value (i.e. progress through the app, consuming application content, etc.), and a corresponding point value will be assigned to that particular event.

Events can be assigned to any application action, combination of actions, timeliness of actions, or repetition of actions. The structure of events reporting to the platform 110 can be defined in the requirements definition phase of the project, and will serve as a blueprint for implementing the rewards structure into the application.

As users interact with the application, consume various pieces of content, share content to social media, participate in fitness activities, etc. they will accumulate points on the Captive Reach platform. Points are used as a system of accounting for rewarding users for certain behaviors. The method of providing rewards to the user will be through the use of a digital profile that is representative of their progress and usage of the mobile application. As users frequently utilize the various features and functionality of the application, they will be rewarded with medals, badges and points that can be redeemed for various items. As mentioned previously, points can be used as a system of record for applying these rewards to a user's avatar, such that once a certain point threshold is met, the user's avatar will automatically upgrade.

The primary areas of the application, which will be enabled with the events based architecture, include but are not limited to: Social Media sharing; Consuming recent application content; Percentage of the application used; Percentage completion of mobile app; Consumption of specific application content; Regular usage of the application; and Consuming news and information.

Reach Link 112 can be an API layer built into Captive Reach 110 for the purpose of integrating with already existing data systems. Reach link 112 serves as a layer in the platform to both integrate already existing APIs for the sake of enabling some new functionality on the mobile application, by using the Captive Reach platform 110 as a conduit. Also, reach link is used for the sake of ingesting content into the CMS module 128 through a feed, which eliminates the need for manual updates to the CMS in order to ensure that fresh and relevant content is being pushed to the mobile application. Reach Link 112 can therefore be a crucial piece of the Captive Reach platform 110, as it allows for the integration of already existing systems into the front-end mobile applications being built off of Captive Reach 110.

The portal section can be included in platform 110 to allow an administrator to change the default logo on the backend platform 110. This is done to allow the brand (e.g., client or business) to easily customize the platform 110 according to their logo and style guidelines. Additionally, the portal section of the backend platform 110 can be configured to allow the administrator to select time zones for scheduling content on the mobile application to ensure that content is delivered at the correct time to the front-end users.

A modules section can be included in platform 110 to allow an administrator of Captive Reach 110 to toggle the various modules on the backend platform 110 on or off depending on their business needs the functionality of the front-end mobile application. The platform 110 can be built in a playbook architecture, which allows for easy configuration of features and modules on a per client basis with no extra development efforts.

A users section can be included in platform 110 to allow an administrator to add both new admin and child users to the platform 110. Users are configured to have various access rights to the platform 110 including full administrator rights, or limited rights according to access to various modules or geographic regions for content distribution.

A locations section can be included in platform 110 to allow an administrator to populate the internal locations database with new places for the sake of geofencing content being run through the Captive Reach platform 110. This section can house all of the locations used for geo-fencing, and can be added to, subtracted from, or updated at any time without the need to utilize development talent to make these changes.

A categories section can be included in platform 110 to allow an administrator to actually add, subtract, or rearrange the categories on the front-end user interface of the mobile application. Also, category icons can be assigned to a particular module of the platform 110 in order to enable a particular function on the front-end mobile application. By having dynamic categories on the back-end platform 110, the administrator has the ability to manipulate the application's front-end user interface dynamically, without having to do additional development, or make a new submission to the respective application marketplaces. This is particularly valuable when the need arises to add a new section to the application for content distribution on the fly.

Figure 2:
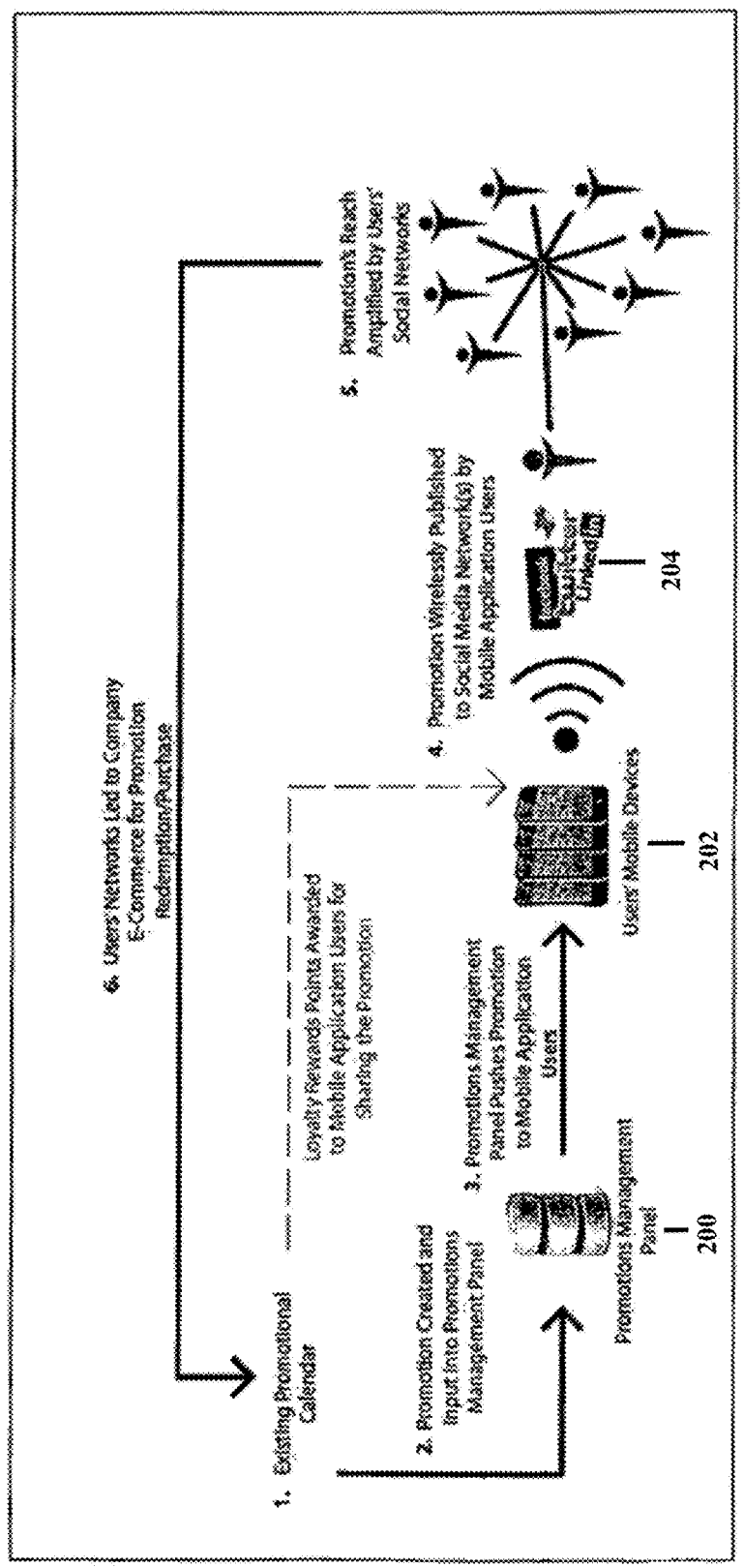
FIG. 2 is an exemplary illustration of a platform included in the system of FIG. 1 being used to run a promotion through user's mobile device in accordance with one embodiment.

As noted above, system 100 can be used to provide users with incentives to share offers and content, e.g., via their social media accounts. FIG. 2 is a diagram illustrating an implementation of such incentive-based digital content and information sharing. Referring to FIG. 2, it can be seen that a promotions management panel 200, configured to run on platform 110 can be configured to, for example, push promotions to a plurality of user devices 202. As noted above, a mobile application can first be downloaded, for example, to mobile operating systems, tablets, PCs, Macs, and other operating systems alike. The application allows users to receive digital content from a central backend platform 110 that can, for example, be built as a Software-as-a-Service (SaaS) platform.

The operating party, e.g., brand, client, business, etc., of the SaaS platform 110 can then be provided with the ability to upload digital content into the platform that can be pushed to all users who have downloaded the application.

Users of the application can have the option to customize the content that they receive from the platform 110 and push it to their Social Media network(s) 204. Some typical types of digital content that can be pushed to Social Media include but are not limited to, promotions, text-based messages, images, audio and videos.

Users are provided an incentive to share this content to their Social Media assets. Such incentives include but are not limited to loyalty points, rewards points, discounts on products, coupons, memberships and giveaways. When digital content is shared to the application user's Social Media platform, the incentive is then awarded to that user through the Promotions Management Panel 200.

The intent of sharing digital content to Social Media is to utilize the user's existing Social Media network to gain exposure for that digital content. In the case of a business utilizing this software, a user would share information or a promotion for a specific product or company initiative, and members of the user's Social Media network would then be exposed to that content resulting in an impression as in traditional advertising. The more members of the user's Social Media community that engage with the digital content that is shared to the user's Social Media assets, the greater the exposure given to that piece of digital content, and the higher the likelihood that the content goes "viral." An example of this software platform as executed for a company running a promotion through user's mobile platforms is illustrated in FIG. 2. In this example, the incentive for users to share the digital content is the awarding of loyalty rewards points.

It is worth mentioning that this application provides businesses, organizations, agencies and individual users a method of promoting a piece of digital content through leveraging an existing Social Media community as a conduit for sharing that piece of content The software does this by providing a back end SaaS platform 110 for the primary user of the software to input the digital content that they wish to share through Social Media, it provides a mechanism to reach people present in the existing Social Media community to receive that content through the use and download of an application that can be either on a mobile device, a tablet device or downloaded to a browser. The application provides the application users with a channel to share that content to their individual Social Media Networks. The application also provides its users incentives for sharing a piece of content to their Social Media networks by giving them rewards for each piece of content shared.

The software platform 110 offers the central user an entire backend system that provides reports and analytics on number of application opens, content views and content shares. This allows the central user to directly view the effectiveness and response levels to each piece of digital content that is uploaded into the Promotions Management Panel 200. The Promotions Management Panel also offers a number of customizable features which allow the central user to differ the look and feel of the digital content that they are uploading into the Promotions Management Panel 200, determine the incentive awarded for sharing of the digital content and duration of time with which digital content can be shared.

FIGS. 2-10 and the corresponding description of copending U.S. patent application Ser. No. 13/373,856, entitled "System of Incentive Based Digital Content and Information Sharing Platform Through Mobile Technology," filed on Dec. 2, 2011, which is incorporated herein by reference as if set forth in full, provides a detailed description of example systems and methods for providing incentives to users to share offers and other special promotions provided through an application built on a platform 110.

Figure 3:
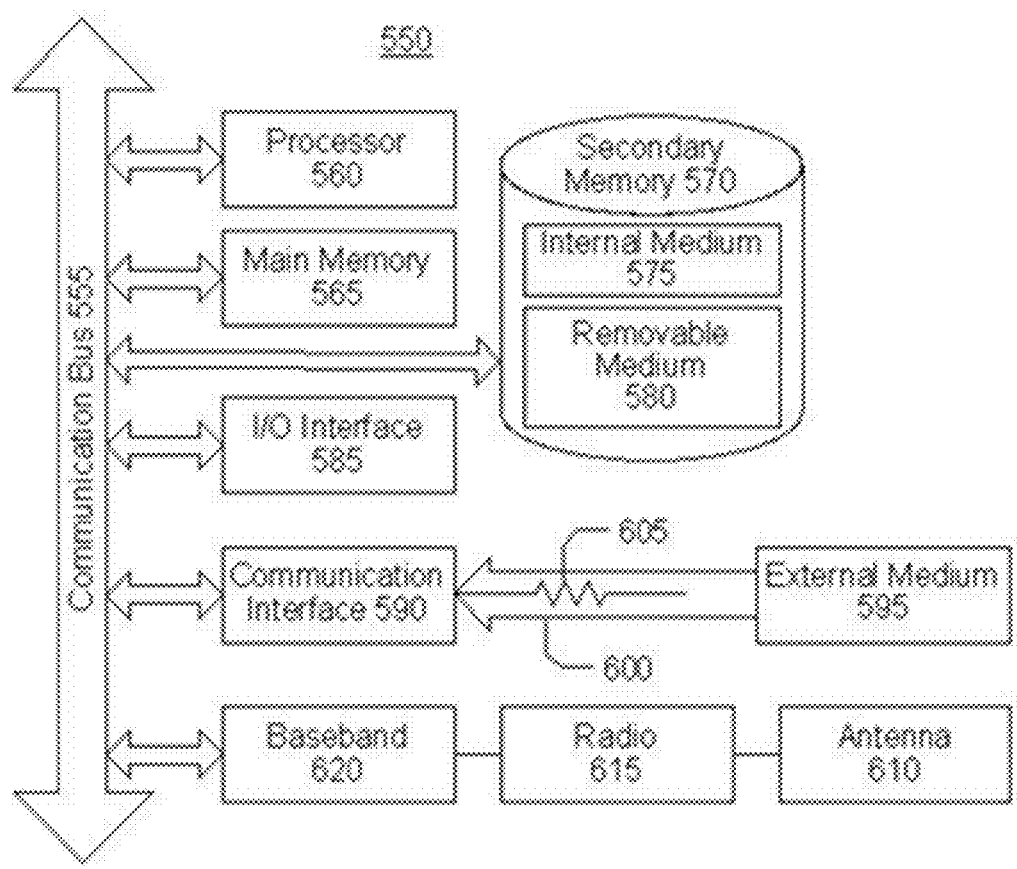
FIG. 3 is a diagram illustrating a processing system on which one or more of the processes described herein may be executed, according to an embodiment.

FIG. 3 is a block diagram illustrating an example wired or wireless system 550 that can be used in connection with various embodiments described herein. For example the system 550 can be used as or in conjunction with one or more of the mechanisms or processes described above, and may represent components of device, the corresponding backend server(s), and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A system comprising:
   at least one hardware processor; and
   one or more software modules that are configured to, when executed by the at least one hardware processor,
   receive an identification of one or more target locations from a client, wherein each of the target locations identifies a predetermined place,
   for each of the one or more target locations,
   apply at least one of a plurality of categories to the target location, wherein the plurality of categories comprise: a client location, a competitor location, a sponsor location, or a partner location,
   assign a vertical to the target location, wherein the vertical characterizes a type of a market associated with the target location, and
   automatically select, for the target location, one insight algorithm from a plurality of different insight algorithms, wherein each of the plurality of different insight algorithms are associated with one or more of the plurality of categories and verticals, wherein each of the plurality of different insight algorithms determines occurrence of an event based on the location of each user device and at least on additional criteria of the event and whether to store event records for a plurality of user devices based on the location of each user device in view of the associated at least one of the plurality of categories and vertical, and wherein the selected insight algorithm is based on the applied at least one of the plurality of categories and the vertical of the target location;
   detect a location of the user device:
   determine a presence of a user device in one of the one or more target locations based on the detected location of the user device;
   determine occurrence of an event with the insights algorithm of the one of the one or more target locations when the user device is present at the one of the one or more target locations and when at least on additional criteria of the event is met:
   determine to store event records relating to the determined occurrence of the event according to the insight algorithm selected for the one of the one or more target locations; and
   generate a reportable insight based on the presence of the user device in the one of the one or more target locations according to an insight algorithm associated with the one of the one or more target locations, wherein the reportable insight identifies when the user device is in the one of the one or more target locations.

2. The system of claim 1, wherein the one or more software modules are further configured to:
receive content,
associate the one or more target locations with the content, and
for each of the plurality of user devices,
receive the location of the user device,
determine whether or not the location of user device corresponds to at least one of the one or more target locations,
when the location of the user device corresponds to at least one of the one or more target locations, transmit the content to the user device, and,
when the location of the user device does not correspond to any of the one or more target locations, not transmit the content to the user device.

3. The system of claim 2, wherein the one or more target locations comprise a latitude-longitude coordinate, and wherein determining whether or not the location of the user device corresponds to at least one of the one or more target locations comprises determining whether or not the location of the user device is within a predefined radius of the latitude-longitude coordinate.

4. The system of claim 2, wherein the one or more software modules are further configured to:
communicate with a client application on at least one of the plurality of user devices, wherein the client application is configured to receive the content and, in response to an operation of a user of the at least one user device, share the content on one or more social media sites, and,
when the content is shared from the client application, award an incentive to a user of the at least one user device.

5. The system of claim 4, wherein the incentive is one or more loyalty points.

6. The system of claim 5, wherein the one or more software modules are further configured to:
receive a plurality of content, and
assign one or more loyalty points to each of the plurality of content.

7. The system of claim 4, wherein the one or more software modules are further configured to disable sharing of the content from the client application.

8. The system of claim 1, wherein determining whether or not to store an event record for the user device is further based on a duration that the user device remains at a location corresponding to the target location.

9. The system of claim 1, wherein determining whether or not to store an event record for the user device is further based on whether or not the location of the user device is within a predefined radius of a home location associated with the user device.

10. The system of claim 1, wherein the event record comprises demographic information for a user of the user device.

11. A method comprising using at least one hardware processor to:
receive an identification of one or more target locations from a client;
for each of the one or more target locations, wherein each of the target locations identifies a predetermined place;
apply at least one of a plurality of categories to the target location, wherein the the plurality of categories comprise: a client location, a competitor location, a sponsor location, or a partner location;
assign a vertical to the target location, wherein the vertical characterizes a type of a market associated with the target location; and
automatically select, for the target location, one insight algorithm from a plurality of different insight algorithms, wherein each of the plurality of different insight algorithms are associated with one or more of the plurality of categories and verticals, wherein each of the plurality of different insight algorithms determines occurrence of an event based on the location of each user device and at least on additional criteria of the event and whether to store event records for a plurality of user devices based on the location of each user device in view of the associated at least one of the plurality of categories and vertical, wherein the selected insight algorithm is based on the applied at least one of the plurality of categories and vertical of the target location;
detect a location of the user device;
determine a presence of a user device in one of the one or more target locations based on the detected location of the user device;
determine occurrence of an event with the insights algorithm of the one of the one or more target locations when the user device is present at the one of the one or more target location and when at least on additional criteria of the event is met;
determine to store event records relating to the determined occurrence of the event according to the insight algorithm selected for the one of the one or more target locations; and
generate a reportable insight based on the presence of the user device at the one of the one or more target locations according to an insight algorithm associated with the one of the one or more target locations, wherein the reportable insight identifies when the user device is in the one of the one or more target locations.

12. The method of claim 11, further comprising using the at least one hardware processor to:
receive content;
associate the one or more target locations with the content; and,
for each of the plurality of user devices,
receive the location of the user device,
determine whether or not the location of user device corresponds to at least one of the one or more target locations,
when the location of the user device corresponds to at least one of the one or more target locations, transmit the content to the user device, and,
when the location of the user device does not correspond to any of the one or more target locations, not transmit the content to the user device.

13. The method of claim 12, wherein the one or more target locations comprise a latitude-longitude coordinate, and wherein determining whether or not the location of the user device corresponds to at least one of the one or more target locations comprises determining whether or not the location of the user device is within a predefined radius of the latitude-longitude coordinate.

14. The method of claim 12, further comprising using the at least one hardware processor to:
communicate with a client application on at least one of the plurality of user devices, wherein the client application is configured to receive the content and, in response to an operation of a user of the at least one user device, share the content on one or more social media sites, and,
when the content is shared from the client application, award an incentive to a user of the at least one user device.

15. The method of claim 14, wherein the incentive is one or more loyalty points.

16. The method of claim 15, further comprising using the at least one hardware processor to:
receive a plurality of content, and
assign one or more loyalty points to each of the plurality of content.

17. The method of claim 14, further comprising disabling sharing of the content from the client application.

18. The method of claim 11, wherein determining whether or not to store an event record for the user device is further based on a duration that the user device remains at a location corresponding to the target location.

19. The method of claim 11, wherein determining whether or not to store an event record for the user device is further based on whether or not the location of the user device is within a predefined radius of a home location associated with the user device.

20. A non-transitory computer-readable medium having instructions stored thereon, wherein the instructions, when executed by a processor, cause the processor to:
receive an identification of one or more target locations from a client, wherein each of the target locations identify a predetermined place;
apply at least one of a plurality of categories to each of the one or more target locations, wherein the plurality of categories comprise: a client location, a competitor location, a sponsor location, or a partner location;
assign a vertical to the target location, wherein the vertical characterizes a type of a market associated with the target location; and
automatically select, for the target location, one insight algorithm from a plurality of different insight algorithms, wherein each of the plurality of different insight algorithms are associated with one or more of the plurality of categories and verticals, wherein each of the plurality of different insight algorithms determines occurrence of an event based on the location of each user device and at least on additional criteria of the event and whether to store event records for a plurality of user devices based on the location of each user device in view of the associated at least one of the plurality of categories and vertical, wherein the selected insight algorithm is based on the applied at least one of the plurality of categories and vertical of the target location;
detect a location of the user device;
determine a presence of a user device in one of the one or more target locations based on the detected location of the user device;
determine occurrence of an event with the insights algorithm of the one of the one or more target locations when the user device is present at the one of the one or more target locations and when at least on additional criteria of the event is met;
determine to store event records relating to the determined occurrence of the event according to the insight algorithm selected for the one of the one or more target locations; and
generate a reportable insight based on the presences of the user device at the one of the one or more target locations according to an insight algorithm associated with the one of the one or more target locations, wherein the reportable insight identifies when the user device is in the one of the one or more target locations.

* * * * *